T. R. FELTS.
RESILIENT TIRE CASING EXPANDER.
APPLICATION FILED MAY 15, 1916.

1,214,768.

Patented Feb. 6, 1917.
2 SHEETS—SHEET 1.

Witnesses
H. B. Wooden,
R. L. Parker.

T. R. Felts
Inventor,
by C. A. Snow & Co.
Attorneys.

T. R. FELTS.
RESILIENT TIRE CASING EXPANDER.
APPLICATION FILED MAY 15, 1916.
1,214,768.
Patented Feb. 6, 1917.
2 SHEETS—SHEET 2.
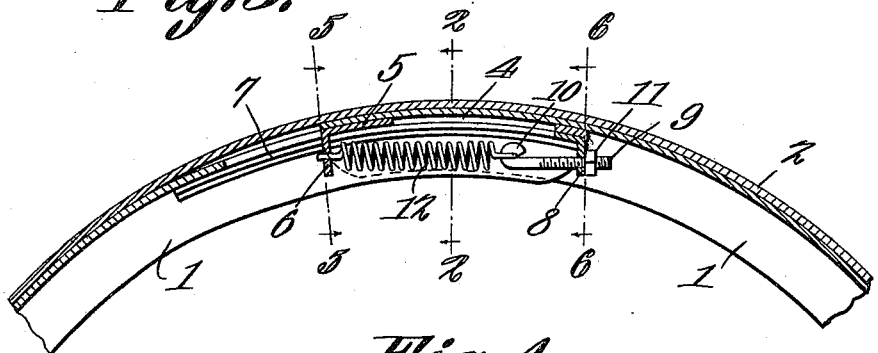
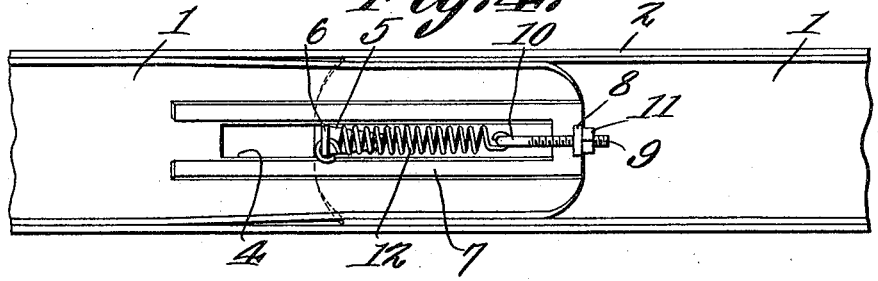
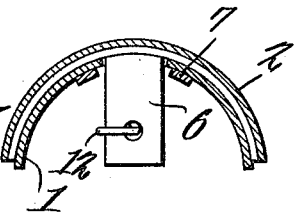
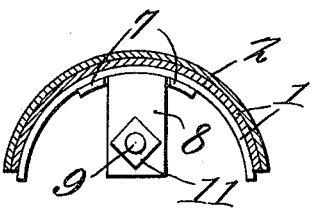
Witnesses
F. B. Wooden
R. L. Parker
T. R. Felts
Inventor,
by C. A. Snow & Co.
Attorneys.

UNITED STATES PATENT OFFICE.

THOMAS RUFFUS FELTS, OF BERLIN, ALABAMA.

RESILIENT TIRE-CASING EXPANDER.

1,214,768.  Specification of Letters Patent.  Patented Feb. 6, 1917.

Application filed May 15, 1916. Serial No. 97,638.

*To all whom it may concern:*

Be it known that I, THOMAS R. FELTS, a citizen of the United States, residing at Berlin, in the county of Dallas and State of Alabama, have invented a new and useful Resilient Tire-Casing Expander, of which the following is a specification.

The present invention appertains to vehicle tires, and aims to provide a flexible and resilient metallic device adapted to fit within a rubber or equivalent tire casing to expand the same, the present device supplanting the ordinary inflated tube and giving the tire the desired resiliency without the liability of the same being punctured or otherwise disabled.

It is also within the scope of the invention to provide a tire casing expander of the nature indicated which is comparatively simple, light and inexpensive in construction, as well as being serviceable, efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
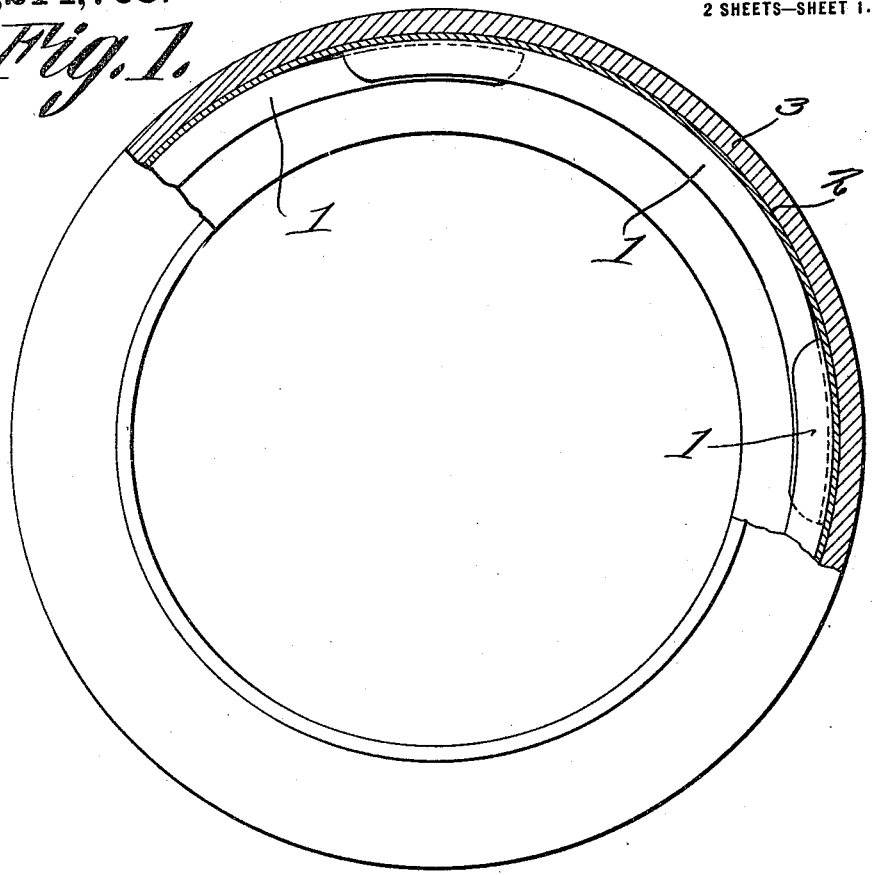
Figure 2:
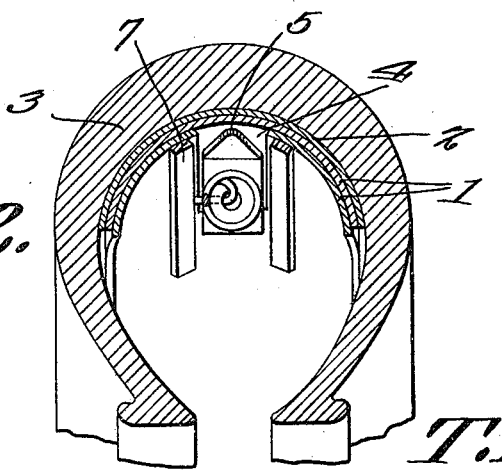

Figure 1 is a side elevation of an automobile or motor vehicle tire, portions being shown in section to illustrate the expander within the tire casing. Fig. 2 is an enlarged cross section of the tire taken on the line 2—2 of Fig. 3, showing the tire casing. Fig. 3 is a longitudinal section of a portion of the expander. Fig. 4 is a plan view of that portion of the expander illustrated in Fig. 3. Figs. 5 and 6 are enlarged cross sections taken on the lines 5—5 and 6—6, respectively, of Fig. 3.

The expander comprises an annular series of arcuate sheet metal sections 1 having their ends overlapped. A circular covering 2 of canvas, duck, or equivalent tough pliable material surrounds the sections 1. The sections 1 are concaved longitudinally and transversely so as to fit snugly within the tire casing 3 which is of rubber or equivalent material, and which is applied to the felly of the wheel in the usual manner, the usual inner tube being eliminated and the present device being substituted therefor. The covering 2 in surrounding the metallic sections prevents said sections from chafing or cutting the casing.

The sections 1 are overlapped and slidably connected, and springs connect the adjacent or companion sections 1 whereby said sections, as a whole, are expanded for expanding the casing 3, the springs tending to separate the sections 1 and enabling said sections to move together when necessary due to the flexure of the tire casing. The ends of the sections 1 are overlapped, and the overlapped end portions which are innermost are provided with longitudinal slots 4 between the side edges of the sections. Plates or members 5 are soldered, welded or otherwise secured to the inner sides of the overlapped end portions of the sections 1 which are outermost, and the members 5 are provided with inwardly projecting ears 6 projecting through the slots 4, said members 5 working snugly within the slots 4 for slidably connecting the adjacent ends of the sections.

U-shaped reinforcing members 7 of sheet metal or other suitable material are soldered, welded or otherwise secured to the inner sides of the inner overlapped end portions with the bends or intermediate portions of the members 7 adjacent the respective ends of the sections, and with the limbs of the members 7 projecting toward the other ends of the sections 1 along the side edges of the slots 4 to reinforce or strengthen the slotted portions of the sections. The limbs of the members 7 are curved to agree with the curvature of the sections 1, and the intermediate portions or bends of the members 7 are provided with inwardly projecting ears 8 adjacent the inner ends of the sections 1.

Bolts or stems 9 are engaged slidably through apertures in the ears 8, and are provided at those ends nearest the respective ears 6, with hooks 10, and nuts 11 are threaded upon the bolts 9 and seat against those sides of the ears 8 remote from the respective ears 6. Coiled wire retractile springs 12 are disposed between the bolts 9 and ears 6, and have their ends engaged to the hooks 10 and through the ears 6, whereby the spring 12 connects the adjacent ends of the sections 1. The springs thus tend to pull the ends of the sections together, thereby separating the sections and expanding the sections as a whole. The ears 6 and 8, springs 12 and bolts 9 are housed within the sections 1 and do not contact with the casing 3.

The device may be readily inserted within the tire casing, in which event the casing may be attached to the wheel in the ordinary manner, and the curvature of the sections 1 causes the device to fit snugly within the casing without distorting the same. Since the springs 12 tend to separate the sections 1, the sections, as a whole, will expand, thereby expanding the casing 3 in the manner that it is expanded by an inflated inner tube. The casing may yield when passing over obstructions, in which event the sections 1 are forced inwardly and toward one another, causing the spring 12 to expand. As soon as the pressure is relieved, the springs 12 in contracting will separate the sections 1 for again expanding the tire casing.

The present device provides an admirable substitute for a pneumatic inner tube tire, and avoids the possibility of the disablement of the tire by punctures.

Having thus described the invention, what is claimed as new is:

An annular tire casing expander of arcuate cross section adapted to fit snugly in a tire casing and having overlapped end portions, the inner end portion having a longitudinal slot, an inwardly projecting ear attached to the outer end portion and projecting through said slot, a U-shaped member secured to the inner side of the inner end portion with its bend adjacent the respective end of the expander and with its limbs projecting away from said end along the edges of the said slot, the bend of said member having an inwardly projecting ear, and a retractile spring connecting said ears.

In testimony that I claim the foregoing as my own, I have hereto affixed my signatured in the presence of two witnesses.

THOMAS RUFFUS FELTS.

Witnesses:
W. J. STEPHENSON,
D. B. JONES.

Copies of this patent may be obtained for five cents each, by addressing the "Commissioner of Patents. Washington, D. C."